United States Patent [19]

Nagabhusan

[11] Patent Number: 5,145,468
[45] Date of Patent: Sep. 8, 1992

[54] ADJUSTABLE CYCLOIDAL SPEED REDUCER

[75] Inventor: Prabhakar Nagabhusan, Marlboro, Mass.

[73] Assignee: Compudrive Corporation, Maynard, Mass.

[21] Appl. No.: 637,784

[22] Filed: Jan. 7, 1991

[51] Int. Cl.⁵ .............................................. F16H 1/28
[52] U.S. Cl. .................................. 475/170; 475/169; 475/181; 475/179
[58] Field of Search ............... 475/168, 169, 170, 176, 475/178, 179, 181, 193, 194, 195

[56] References Cited

U.S. PATENT DOCUMENTS

| | | | |
|---|---|---|---|
| 747,016 | 12/1903 | Sundh et al. | 475/195 X |
| 1,370,080 | 3/1921 | Ahond | 475/193 |
| 3,352,176 | 11/1967 | Brundage | 475/169 |
| 3,998,112 | 12/1976 | Pierrat | 475/168 |
| 4,524,644 | 6/1985 | Pierrat | 475/181 X |

FOREIGN PATENT DOCUMENTS

| | | | |
|---|---|---|---|
| 0020314 | 12/1980 | European Pat. Off. | 475/168 |
| 3807500 | 9/1989 | Fed. Rep. of Germany | 475/170 |
| 81/03367 | 11/1981 | World Int. Prop. O. | 475/170 |

*Primary Examiner*—Richard Lorence
*Assistant Examiner*—Benjamin Levi
*Attorney, Agent, or Firm*—Finnegan, Henderson, Farabow, Garrett & Dunner

[57] ABSTRACT

A cycloidal speed reducer having a plurality of rotatable, tapered, concentric bearings each having a tapered bearing surface adapted for contact with a peripheral tapered surface of a movable member. The contacting tapered bearing and peripheral surfaces are relatively adjustable to provide contact therebetween.

11 Claims, 4 Drawing Sheets

ADJUSTABLE CYCLOIDAL SPEED REDUCER

BACKGROUND OF THE INVENTION

1. Field of the Invention

The invention relates to a cycloidal speed reducer having axially adjustable pin-mounted rollers to reduce backlash or free-play between components of the device.

2. Description of the Prior Art

Cycloidal speed reducers are known in the art for applications requiring transmission of rotational movement or torque at selected, varying speed reductions. Devices of this type include an eccentrically mounted, multilobed cam that orbits in response to input from a drive shaft within a plurality of circularly disposed pin-mounted rollers. The orbiting action of the cam imparts at reduced speed the torque from the input shaft to an output shaft of the device.

An example of a device of this type with which the invention of this application finds particular utility is described in U.S. Pat. No. 3,998,112 issued Dec. 21, 1976.

In prior art devices of this type, to provide a desired, accurate ratio of speed reduction it is necessary to reduce the free-play or backlash between components of the device. Most critical in this regard is the contact between the pin-mounted rollers and the multilobed cam surface in rolling contact therewith. Contact between these components is conventionally provided by individually adjusting each pin and associated roller relative to the interacting cam surfaces. This practice is cumbersome and time consuming and is used only in applications where accurate ratios of speed reduction are required Otherwise, the free-play between these components and the resulting inaccuracy of the ratio of speed reduction is tolerated.

SUMMARY OF THE INVENTION

It is accordingly a primary object of the present invention to provide a cycloidal speed reducer having means for effectively and accurately reducing the free-play or backlash between the pin-mounted rollers and interacting cam surface of the device to improve the accuracy of the ratio of speed reduction.

A more particular object of the invention is to provide a device of this type wherein the pin-mounted rollers may be unitarily adjusted relative to the interacting cam surface.

In accordance with the invention a drive mechanism is provided having an input shaft and an output shaft with the input and output shafts being rotatably at relatively different speeds. A movable member is connected to the output shaft for imparting movement thereto. A plurality of rotatably, tapered concentric bearings each having a tapered bearing surface are provided and are adapted for bearing contact with a peripheral surface of the movably member. Each of the bearings has a longitudinal axis parallel to a common axis of the input shaft and the output shaft. Means are provided for moving these bearings axially relative to the peripheral surface of the movable member to achieve contact between the bearing surface and the peripheral surface. Selective, adjustable means are provided for rigidly maintaining this contact.

Means may be provided for moving the bearings unitarily.

The bearings may be mounted equally spaced apart on a common circular path concentric with the common longitudinal axis of the input and output shafts.

A second plurality of bearings may be provided. These bearings may be mounted equally spaced apart on a second common circular path concentric with the common longitudinal axis of the input and output shafts. The first and second common circular paths are in opposed, spaced-apart relation.

The movable member may be adapted for orbital movement imparted by eccentric means mounted on the input shaft.

The peripheral surface of the movable member may constitute a series of connected lobes forming a continuous path for causing rotation of the movable member during orbital movement thereof.

The movable member may have a second peripheral surface having a second series of connected lobes forming a second continuous path for acting on the second plurality of bearings to cause rotation of the output shaft, which is connected to the second plurality of bearings.

The first and second tapered bearing surfaces may be adapted to match tapers on the first and second peripheral surfaces, respectively, of the movable member.

Means may be provided for adjusting the eccentricity of the eccentric means. The eccentric means may comprise an eccentric cam portion mounted on the input shaft. The eccentric cam portion may include an eccentric bushing having an axially movable member for movement of the eccentric bushing in a plane normal to the main, common axis of the input and output shafts.

Alternately, each bearing may have a nontapered bearing surface.

The output shaft may be connected to the movable member solely by an actuating member mounted on the input shaft and in driving contact with an interior surface of the movable member to actuate the movable member upon rotation of the input shaft.

The actuating member may have a counter weight mounted thereon to balance the movable member to reduce vibration during movement thereof.

DESCRIPTION OF PREFERRED EMBODIMENTS

Figure 1:
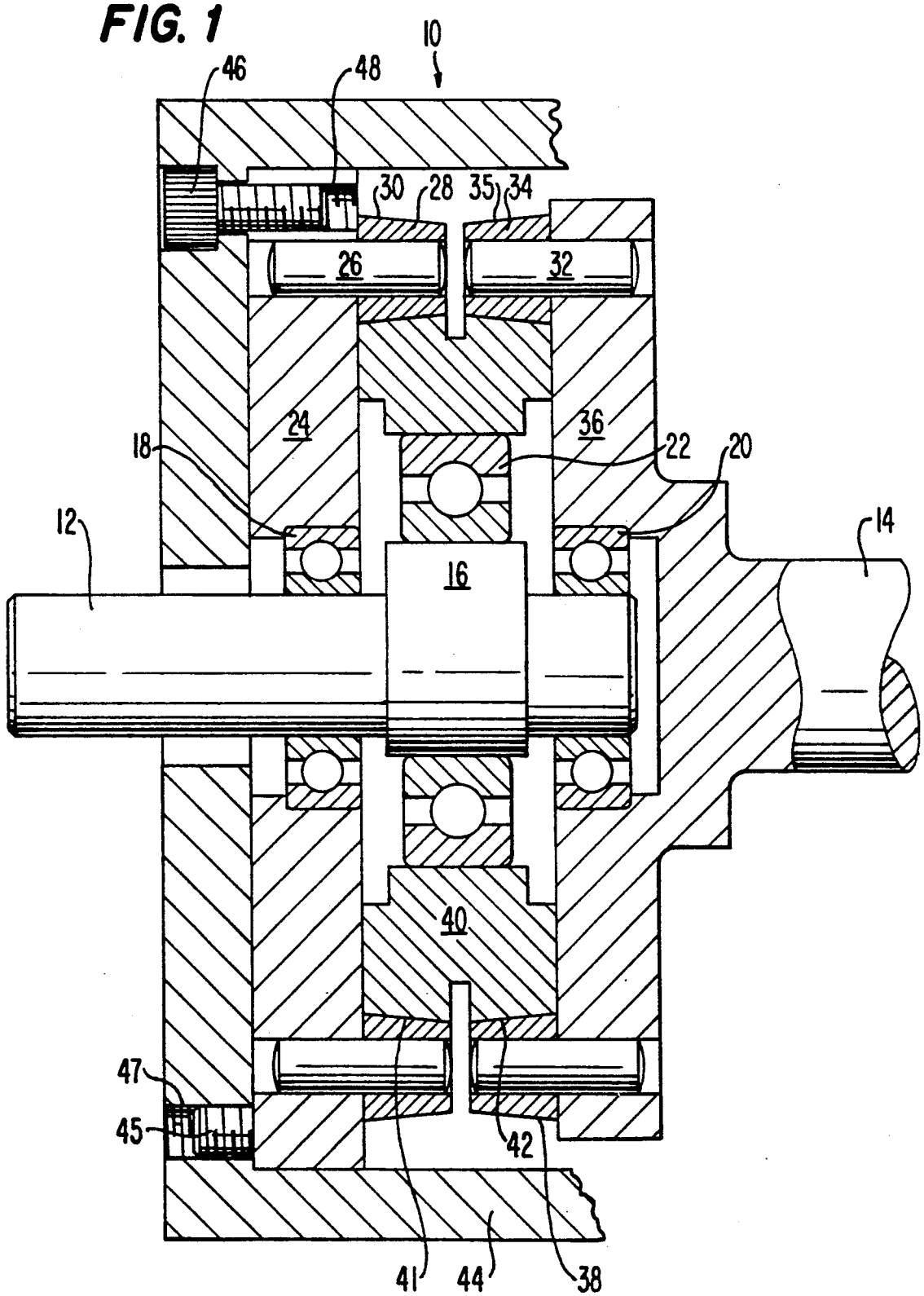
FIG. 1 is a transverse cross section of one drive mechanism in accordance with an embodiment of the invention.
Figure 1A:
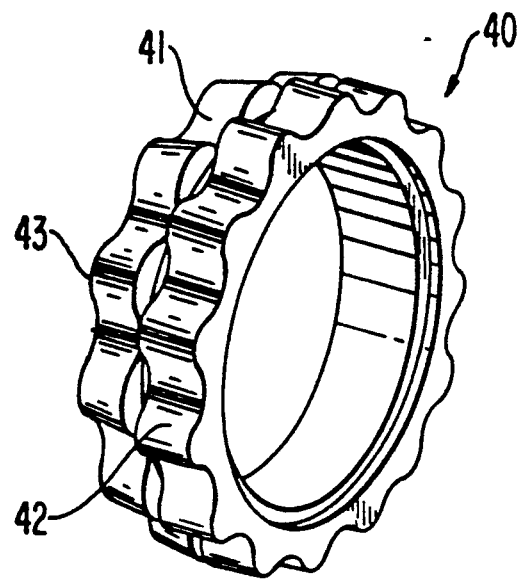
FIG. 1A is a perspective view of the cam component of the drive mechanism of FIG. 1.

With reference to the drawings, and for the present of FIG. 1 thereof, there is shown a drive mechanism, designated generally as 10. The drive mechanism includes an input shaft 12 and an output shaft 14 positioned on a common longitudinal axis. The input shaft 12 has an eccentric cam 16 mounted thereon for rotation with the input shaft. An electric motor (not shown) is provided for rotation of the input shaft 12 in the conventional manner. The input shaft 12 rotates within bearings 18 and 20, and the associated cam 16 rotates within bearings 22. A non-rotatable disc 24 is provided having a plurality of pins 26 and associated rollers 28 mounted therein. The rollers 28 have tapered surfaces 30. A plurality of opposed pins 32 and associated rollers 34 having tapered surface 35 are mounted in a disc portion 36 integral with the output shaft 14. The tapered surfaces 30 and 35 of rollers 28 and 34, respectively, are in contact with tapered surfaces 41 and 42 of cam 40. The surfaces 41 and 42 constitute a series of interconnected lobes 43, as shown in FIG. 1A. The number of lobes provided on surfaces 41 and 42 may be varied depending upon the ratio of speed reduction required, as is well known with devices of this type.

The components of the drive mechanism described above and shown in FIG. 1 are mounted within a housing 44. Threaded bolts, one of which is designated as 46, extend through the housing 44 and into tapped openings 48 in disc 24. In addition, set screws, one of which is designated as 45, are provided each in an associated threaded opening 47 in housing 44. By the adjustment of bolts 46 the disc 24 and associated pins 26 and rollers 28 are unitarily axially moved with respect to the surface 38 of cam 40. The pins are in this manner moved axially until proper contact is achieved between tapered roller surfaces 30 and cam surface 41. In this manner adjustment may be made to eliminate free-play between these interacting surfaces. After disc 24 has been moved to the desired position, set screws 45 are tightened against disc 24. In this manner, disc 24 is secured in position by the set screws and bolts 46.

Figure 2:
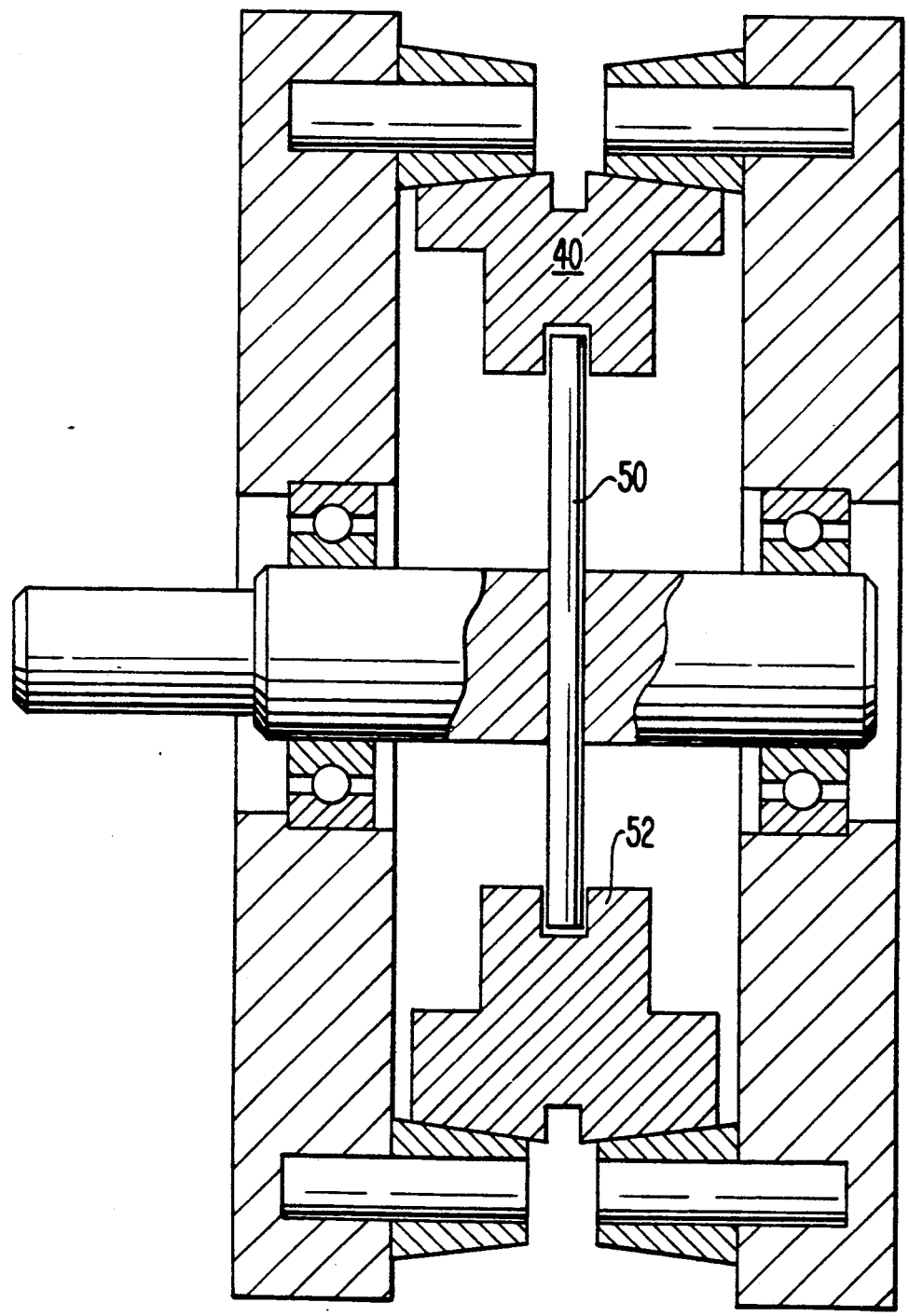
FIG. 2 is a view similar to FIG. 1 showing an alternate embodiment of the invention.

In the embodiment of FIG. 2 like reference numerals are used to designate like components shown in FIG. 1 and described above. With the embodiment of FIG. 2, the eccentric bushing or cam 16 and bearings 18, 20 and 22 of the embodiment of FIG. 1 are eliminated. This is permitted by the use of a transverse bar 50 mounted on the input shaft 12. The transverse bar 50, as shown in FIG. 2, is mounted on the input shaft and contacts the cam 40 within recess 52 thereof. This transverse bar imparts the desired eccentric motion to the cam 40 during rotation of the input shaft.

Figure 3:
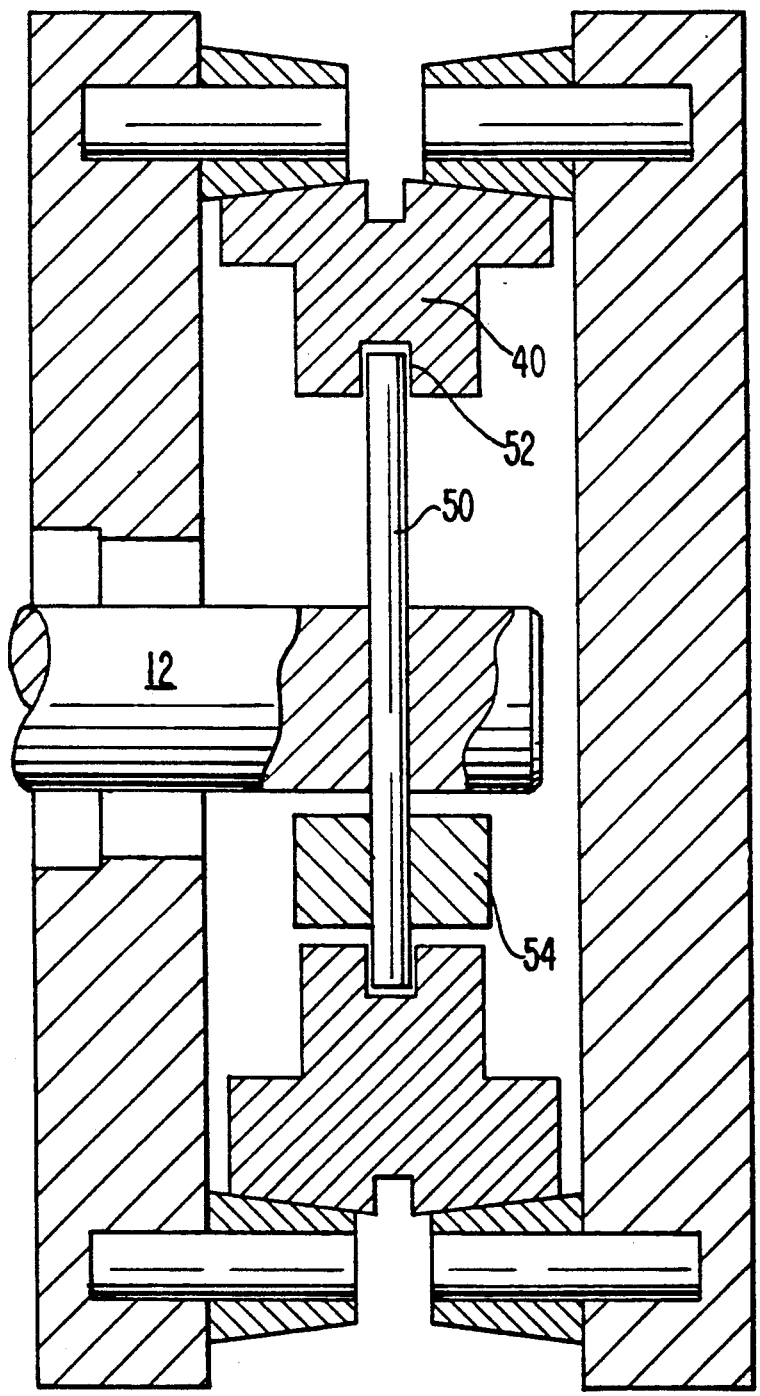
FIG. 3 is a view similar to FIG. 1 showing yet another alternate embodiment of the invention.

In accordance with the embodiment of FIG. 3, a counter weight 54 is mounted on the transverse bar 50 to balance the mechanism during rotation of the input shaft 12 to reduce vibration.

Figure 4:
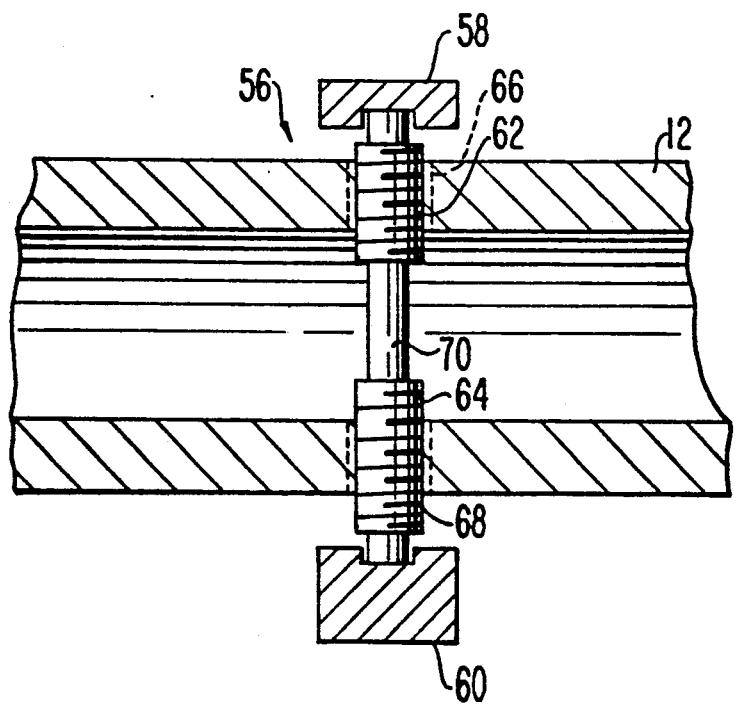
FIG. 4 is a detailed view in cross section of an adjustable eccentric cam for use in accordance with an embodiment of the invention.

FIG. 4 shows an adjustable cam, designated generally as 56, which may be used to replace the eccentric cam 16 of the embodiment of FIG. 1. The adjustable cam 56 has opposed cam surfaces 58 and 60. These cam surfaces are connected to the input shaft 12 by threaded transverse pins 62 and 64, respectively. The transverse pins 62 and 64 have threaded surfaces engaging mating threads in tapped openings 66 and 68, respectively. Rod 70 having a hexagonal cross-section, which is adapted for adjustment by the use of an hexagonal wrench, is connected to the pins 64 and 66 to rotate the same and thus unitarily move surfaces 58 and 60 in directions normal to the axis of the input shaft to adjust the eccentricity of the cam 56.

The drive mechanism after adjustment of the pins 26 and tapered surfaces 30 of roller 28 in accordance with the invention as shown in FIG. 1 and described above is otherwise conventionally operated as described in aforementioned U.S. Pat. No. 3,998,112. In this regard, upon the rotation of input shaft 12 eccentric bushing or ca 16 acting on cam 40 imparts orbital movement to cam 40 which movement is translated into rotational movement of output shaft 14 via contact between the tapered roller surfaces 35 of rollers 34 of pins 32 and the lobes 43 of the cam 40.

In FIG. 1 and the associated description, an arrangement has been shown and described for adjusting only pins 26 and associated roller surfaces 30 with respect to the surface 41 of cam 40. A like arrangement may be provided for the identical adjustment of pins 32 and surfaces 35 of associated rollers 34 relative to surface 42 of cam 40.

Although the roller surfaces 30 and 35 and cam surfaces 41 and 42 are tapered in the above-described embodiments of the invention, relative adjustment thereof may be provided in accordance with the invention with these surfaces being nontapered or uniform along the length thereof.

As may be seen from the above-described embodiments of the invention, in accordance therewith the interacting surfaces of the cam and rollers may be easily adjusted to achieve the contact therebetween required to reduce backlash or free-play. This enables adjustment of each speed reducer before being placed in operation to ensure the desired, accurate ratio of speed reduction between the input and output shafts This adjustment is achieved without requiring disassembly of the pins for this purpose, as is the case with conventional speed reducers.

What is claimed is:

1. A drive mechanism comprising an input shaft having eccentric means mounted thereon and an output shaft with said input and output shafts being rotatable at relatively different speeds, a movable member adapted for orbital movement imparted by said eccentric means and connected to said output shaft for imparting movement thereto, a plurality of rotatable, tapered concentric bearings each having a tapered bearing surface adapted for bearing contact with a peripheral surface of said movable member, each said bearings having a longitudinal axis parallel to a main common axis of said input shaft and said output shaft, means for moving said bearings axially relative to said peripheral surface of said movable member to achieve contact between said bearing surfaces and said peripheral surface, and selectively adjustable means for rigidly maintaining said contact.

2. The drive mechanism of claim 1 wherein said bearings are mounted equally spaced apart on a common circular path concentric with said common longitudinal axis of said input and output shafts.

3. The drive mechanism of claim 2 wherein a second plurality of bearings are mounted equally spaced apart on a second common circular path concentric with said common longitudinal axis of said input and output shafts, said first and second common circular paths being in opposed spaced-apart relation.

4. The drive mechanism of claim 3 wherein said peripheral surface of said movable member constitutes a series of connected lobes forming a continuous path for causing rotation of said movable member during said orbital movement thereof.

5. The drive mechanism of claim 4 wherein said movable member has a second peripheral surface having a second series of connected lobes forming a second continuous path for acting on said second plurality of bearings for causing rotation of said output shaft which is connected to said second plurality of bearings.

6. The drive mechanism of claim 5 wherein said first and second tapered bearing surfaces match tapers on said first and second peripheral surfaces respectively of said movable member.

7. The drive mechanism of claim 6 wherein adjustment means are provided for adjusting eccentricity of said eccentric means.

8. The drive mechanism of claim 7 wherein said eccentric means comprises an eccentric cam portion mounted on said input shaft.

9. The drive mechanism of claim 8 wherein said eccentric cam portion includes an eccentric bushing having an radially movable member for movement of said eccentric bushing in a plane normal to said main, common axis of said input and output shafts.

10. The drive mechanism of claim 3 wherein said input shaft is connected to said movable member solely by an actuating member mounted on said input shaft and in driving contact with an interior surface of said movable member to actuate said movable member upon rotation of said input shaft.

11. The drive mechanism of claim 10 wherein said actuating member has a counter weight mounted thereon to balance said movable member to reduce vibration during movement thereof.

* * * * *